United States Patent [19]

Negrini

[11] 4,126,827

[45] Nov. 21, 1978

[54] STEERING WHEEL MICROPHONE BRACKET ASSEMBLY

[76] Inventor: Maurice A. Negrini, 25 Quimby Ave., Woburn, Mass. 01801

[21] Appl. No.: 803,973

[22] Filed: Jun. 6, 1977

[51] Int. Cl.$^2$ .......... H04B 1/38

[52] U.S. Cl. .......... 325/16; 179/146 R; 200/61.54; 200/61.57

[58] Field of Search .......... 325/15, 16, 117, 312; 179/1 VE, 1 HF, 146 R; 200/61.54, 61.57

[56] References Cited

U.S. PATENT DOCUMENTS

| | | | |
|---|---|---|---|
| D. 247,115 | 1/1978 | Cox et al. | 179/146 R |
| 1,983,195 | 12/1934 | Seiler | 325/312 |
| 2,491,968 | 12/1949 | Gilbert | 325/455 |
| 2,644,858 | 7/1953 | Small | 179/146 R |

*Primary Examiner*—Robert L. Griffin
*Assistant Examiner*—Marc E. Bookbinder
*Attorney, Agent, or Firm*—William Frederick Werner

[57] ABSTRACT

The present construction relates to a microphone adjustably mounted to the steering wheel of a motor vehicle.

6 Claims, 14 Drawing Figures

STEERING WHEEL MICROPHONE BRACKET ASSEMBLY

INVENTION

The present invention relates to the mounting of a microphone upon the steering wheel of a motor vehicle and more particularly to means for adjustably positioning the microphone before the mouth of the speaker.

BACKGROUND OF THE INVENTION

In the past, microphones have been adjustably mounted for proper positioning of the microphone in relation to the mouth of the speaker in radio studios, lecture halls and the like. With the advent of telephones and citizen band radios in motor vehicles, microphones have been inserted in a well or cavity in the top end of a steering column or the microphone was attached to flexible extension wires for manual handling.

Motor vehicles present special problems in the use of microphones. For example, motor vehicles create wheel noise. Traffic creates nuisance noise. These noises readily enter the microphone if not overcome. The driver of a motor vehicle must keep both hands on the steering wheel to safely drive the vehicle. One hand cannot be used to hold a microphone in traffic or at high speeds or when shifting gears. The microphone is normally closed to shut out noise and must be activated to become effective.

OBJECTS OF THE INVENTION

It is accordingly an object of the present invention to provide an adjustable mounting bracket attached to the steering wheel of a motor vehicle to overcome the enumerated problems.

It is another object of the present invention to position the microphone in front of the mouth of the driver-speaker at all times without having an obstruction which could injure the driver-speaker in case of an accident.

It is a further object of the invention to provide detachable connections between the transmitter-receiver and the Steering Wheel Microphone Bracket Assembly.

Other objects of the present invention will become apparent in part and be pointed out in part in the following Specification and Claims.

BRIEF DESCRIPTION OF DRAWINGS

Similar characters of reference refer to like parts in the drawings, in which.

Figures 1, 4, 5, 6, 7, 9:
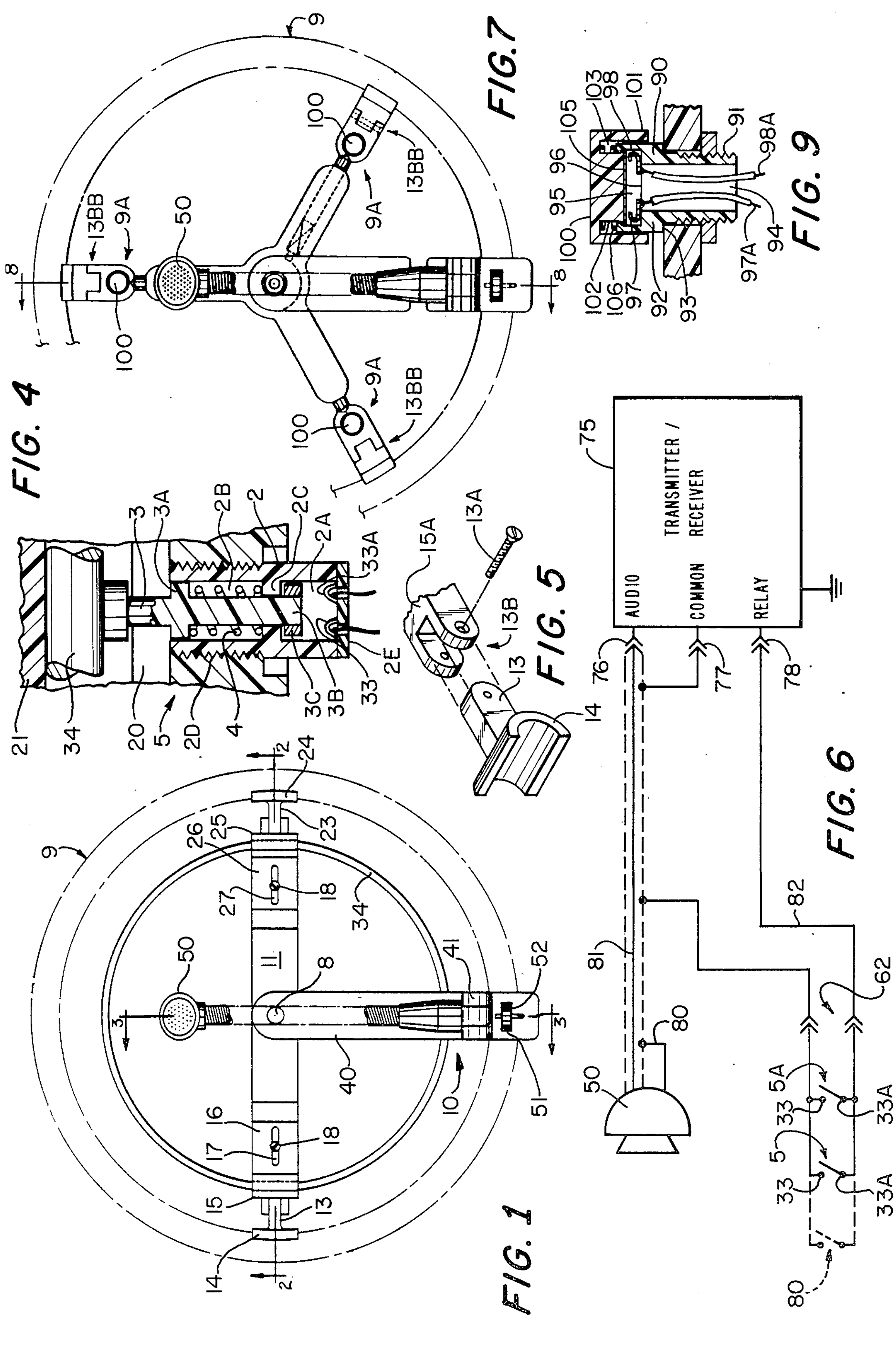
FIG. 1 is a plan view of a steering wheel provided with the new and improved microphone bracket assembly.
FIG. 4 is a vertical cross-sectional view through the electric switch, taken on line 4—4 of FIG. 2.
FIG. 5 is a schematic perspective view of collar frictionally held against the steering wheel.
FIG. 6 is a schematic wiring diagram of the microphone attachable to a citizens band radio.
FIG. 7 is a view similar to FIG. 1, showing a modified form of microphone bracket assembly.
FIG. 9 is a horizontal cross sectional view through the electric switch, taken on line 9—9 of FIG. 8.
Figure 2:
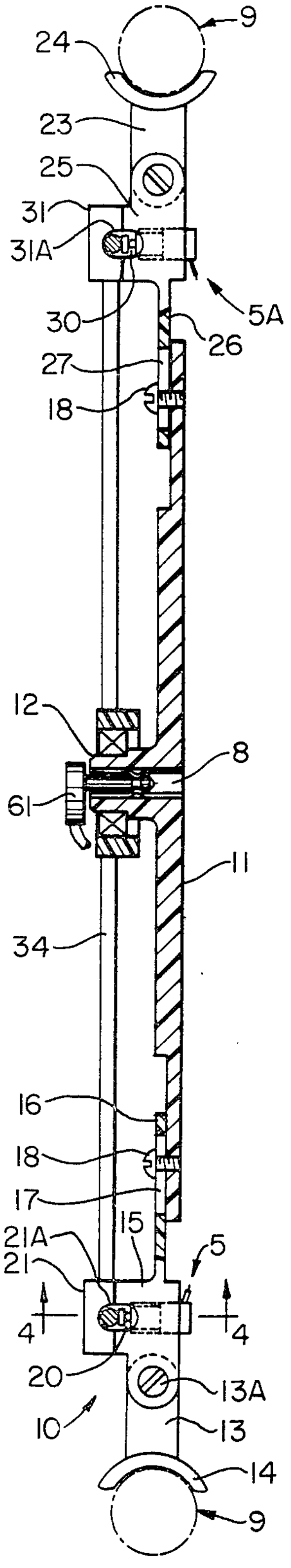
FIG. 2 is a vertical cross sectional view taken on line 2—2 of FIG. 1.
Figure 3:
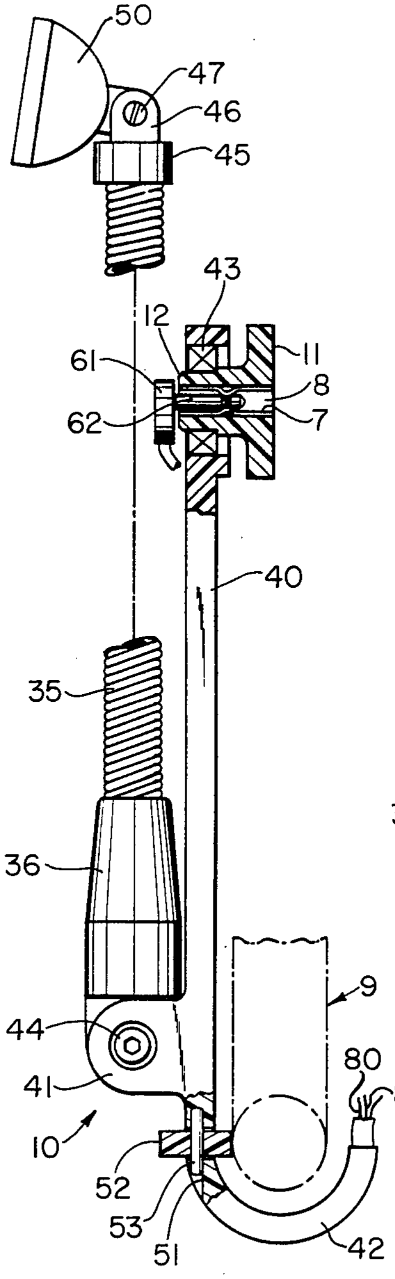
FIG. 3 is a view similar to FIG. 2, taken at right angles to FIG. 2.

In proceeding with this invention, there is illustrated in phantom, the steering wheel of a motor vehicle, generally indicated by reference numeral 9. One form of microphone bracket assembly is generally indicated by reference numeral 10 in in FIGS. 1, 2, 3, 4, 5 and 6. It consists of a mounting arm 11, provided medially, with a projection 12 having a socket 8. A first arcuate collar 14 is provided with a tongue 13. A boss 15 is provided with a bi-furcated end 15-A and a leg 16 having an elongated slot 17. Tongue 13 is fastened to bi-furcated end 15-A by means of a screw 13-A to form a toggle joint, generally indicated by reference numeral 13-B which allows for pivotal adjustment. A fastening means such as a screw 18 fastens leg 16 to mounting arm 11 through elongated slot 17 which allows for slidable adjustment. Boss 15 is provided with a vertical chamber 20. A cover 21, horizontally grooved at 21-A overlies said chamber 20 and is adapted to accommodate a switch ring 34. Means such as welding fastens cover 21 to boss 15.

A first electrical switch assembly, generally indicated by reference numeral 5 comprises a housing 2 having a threaded area 2-D, a large chamber 2-A and a smaller chamber 2-B in communication with said larger chamber 2-A, but separated by a shelf 2-C. A switch button 3 having a shoulder 3A is slidably mounted in chamber 2B with an end 3B extending into chamber 2A.

A switch collar contact 3-C is fastened to end 3-B. A coil spring 4 is interposed between shoulder 3-A and shelf 2-C. A plate 2-E is fastened to housing 2 at chamber 2-A. Two switch contacts 33 and 33-A are fastened to plate 2E and therefore housing 2 and are within chamber 2-A. Housing 2 is fastened to boss 15, with switch button 3 within chamber 20, by means of threads 2-D. Switch button 3 is adapted to engage switch ring 34 and be depressed thereby against the tension of spring 4, whereby, switch contact 3-C engages switch contacts 33 and 33-A to close the microphone 50 circuit.

Similarly, a second arcuate collar 24 is provided with a tongue 23. A boss 25 is provided with a bi-furcated end 25-A and a leg 26 having an elongated slot 27. Tongue 23 is fastened to bi-furcated end 25-A by means of a screw 23-A which allows for pivotal adjustment. A fastening means such as a screw 18 fastens leg 26 to mounting arm 11 through elongated slot 27 which allows for slidable adjustment. Boss 25 is provided with a vertical chamber 20-A, a cover 31 horizontally grooved as at 21-A overlies said chamber 20-A and is adapted to accommodate the switch ring 34. Means such as welding fastens cover 31 to boss 25. A second electrical switch assembly, generally indicated by reference numeral 5-A is constructed and mounted as described for first electrical switch assembly 5.

A pendulum arm 40 provided with a bi-furcated bracket 41, a a hook 42 on one end and a bearing 43 on the other end is pivotally connected to projection 12 through bearing 43. A bracket 36 provided with a gooseneck 35 is pivotally connected to bi-furcated bracket 41 by means of a cap screw 44. A collar 45 having an extension 46 is fastened to one end of gooseneck 35. A microphone 50 is pivotally fastened to bracket 46, as by means of a screw 47.

Pendulum arm 40 is provided with a slot 51. A roller 52 is rotatably mounted in slot 51 by means of a pin 53 fastened in arm 40.

In operation with reference to FIGS. 1, 2, 3, 4 and 5, switches 5 and 5A along with switch ring 34 will be preassembled in bosses 15, 25, respectively. Mounting arm 11 is placed horizontally over the pivotal center of steering wheel 9. Legs 16, 26 are adjusted relative to mounting arm 11 with arcuate collars 14, 24 engaging the inside surface of the rim of steering wheel 9. Screws 18 are tightened. Tongues 13, 23 are forced away from each other in toggle joint action to take up existing slack. Screws 13A and 23A are tightened to fasten microphone bracket assembly 10 to steering wheel 9.

In this position hook 42 is positioned under steering wheel 9 with roller 52 in engagement with the rim of steering wheel 9. The microphone 50 is now in vertical position in front of the driver speaker. Gooseneck 35, being flexible, may be adjusted to a convenient position selected by the driver speaker. Should the driver be forced against the microphone by mishap, the gooseneck will yield, thereby preventing injury to the driver.

Switch ring 34, it will be observed, is conveniently positioned for the driver speaker to manually depress the ring 34 to depress switch contacts 33, 33A to open microphone 50. With manual pressure off ring 34 the springs 4 close the microphone to sound waves by moving switch collar contact 3C away from switch contacts 33, 33A.

A jack spring 7 is fastened in socket 8. A microphone plug 61 having jack 62 is removably secured in jack spring 7.

FIG. 6 depicts a wiring diagram consisting of a transmitter-receiver 75 connected to an external power source such as a storage battery, and provided with electrical connections 76 for audio circuit 77 for a common ground connection and 78 for a microphone relay circuit. A microphone 50 is provided with two electrical conduits 80, 81. Conduit 80 connects the micropone 50 to the common ground 77. Cnduit 81 connects the microphone 50 to the audio circuit 76.

A conduit 82 connects one side of switch 5 and switch 5A in parallel to the microphone relay circuit 78. Switches 5 and 5A are connected on the other side to conduit 80.

A braided ground sheath is shown in FIG. 6 as part of conduit 80. The connections shown at 76, 77, 78 are mechanical, allowing microphone 50 to be detached from transmitter-receiver 75.

FIGS. 6 and 7 show a modified form of microphone bracket assembly 10A. A mounting arm 11A is provided with a projection 12A having a socket 8A, and three legs 1, 2 and 3. Each leg is provided with a passageway 70 having a shoulder 71. Three leg extensions 1A, 1B, 1C, each having an arcuate collar, respectively, 72, 73, 74, are slidably mounted in the respective passageway 70 with a spring 75, interposed between the end of leg extensions 1A, 1B, 1C and respective shoulder 71.

An arm 40A having a bearing 43A is pivotally connected to projection 12A through bearing 43A. A Bifurcated bracket 41A is provided with a hook 42A and a slot 51A. A roller 52A is rotatably mounted in slot 51A by means of a pin 53A fastened in bracket 41A. A bracket 36A provided with a gooseneck 35A is pivotally connected to bi-furcated bracket 41A by means of a cap screw 44A. A connecting pin 77 is fastened on one end to arm 40A and on the other end to bracket 41A to connected arm 40A to bracket 41A. A collar 45A having a bracket 46A is fastened to gooseneck 35A. A microphone 50 is pivotally fastened to bracket 46, as by means of screw 47A.

Figure 8:
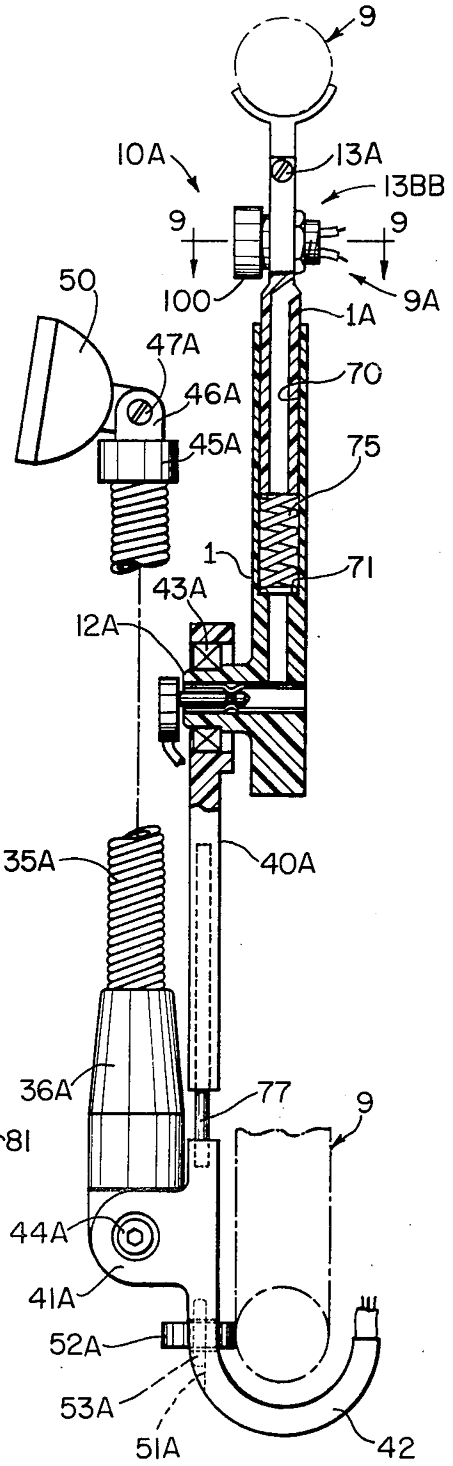
FIG. 8 is a vertical cross sectional view, taken on line 8—8 of FIG. 7.
Figure 10:
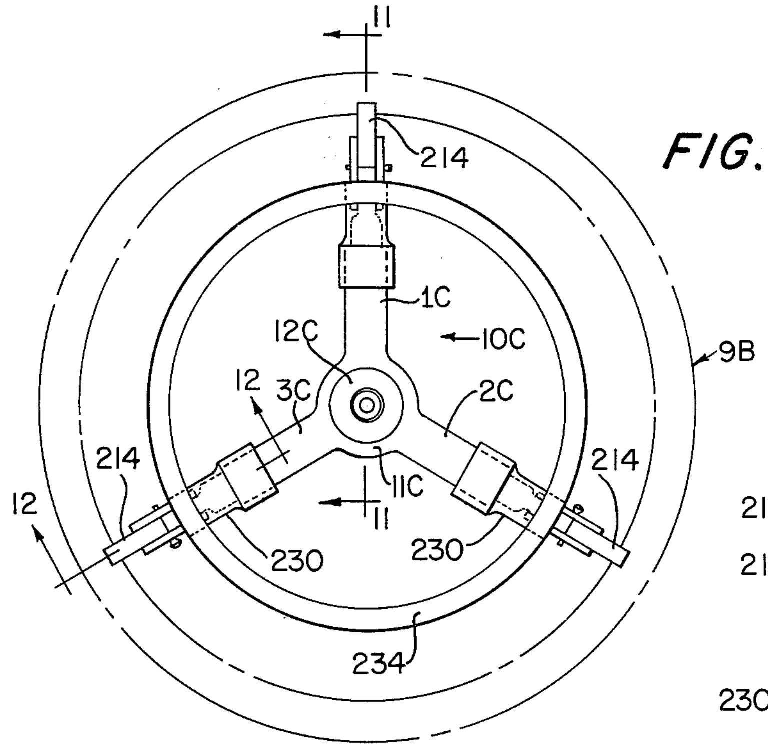
FIG. 10 is a view similar to FIG. 1, showing a second modified form of microphone bracket assembly.
Figure 11:
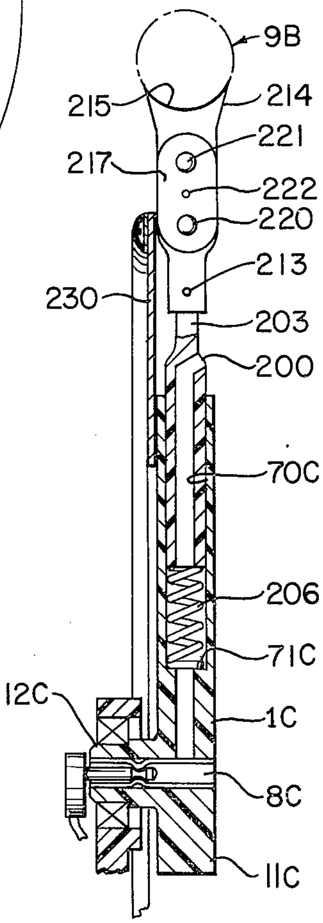
FIG. 11 is a vertical cross sectional view taken on line 11—11 of FIG. 10.
Figure 12:
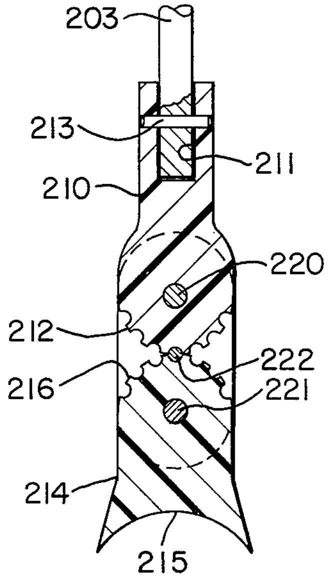
FIG. 12 is a fragmentary cross sectional view taken on line 12—12 of FIG. 10.
Figure 13:
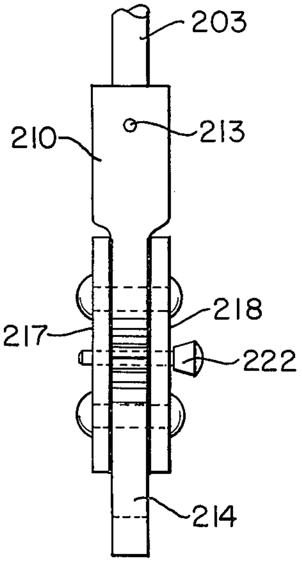
FIG. 13 is a side elevational view of FIG. 12.
Figure 14:
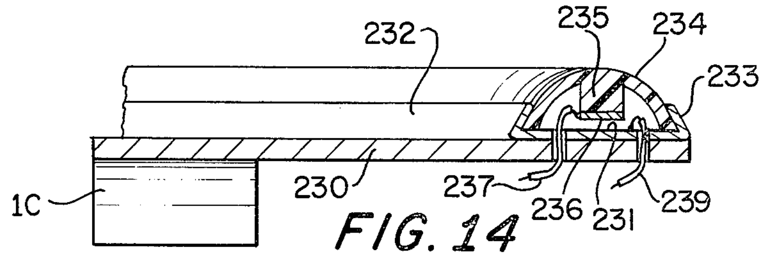
FIG. 14 is a fragmentary cross sectional view, partly in cross section of the switch ring.

The toggle joint 13B of FIG. 5 is again shown at 13BB in FIG. 8. An electrical switch assembly, generally indicated by reference numeral 9A, see FIGS. 7, 8 and 9 comprises a housing 90 having externally a thread 91, a head 92 having a diameter larger than the diameter of said thread, and with a shoulder 93 therebetween. Internally, housing 90 is provided with a passageway 94 connected to a cavity 95 having a shelf 96. Two electrical contacts 97, 98 having lead wires 97A, 98A are fastened to shelf 96 with the contacts 97, 98 located in cavity 95 and the lead wires 97A, 98A passing through and beyond passageway 94.

A switch button 100 is formed so as to provide an outside skirt 101 and an inside round flange 102 with a space 103 between said flange 102 and skirt 101. A switch contact 105 is fastened to said round flange. A coil spring 106 is located in space 103 between switch button 100 and electrical contacts 97, 98, so as to yieldingly hold switch contact 105 away from electrical contacts 97, 98. The end of head 92 is forced inwardly at cavity 95 so as to slidingly engage round flange 102 to prevent spring 106 from separating switch button 100 from head 92.

There is an electrical switch assembly 9A located in each of said legs 1, 2 and 3. The microphone plug 61 having jack 62 is removably secured in jack spring 7 located in socket 8A as previously described.

In operation, mounting arm 11A is placed horizontally over the pivotal center of the steering wheel 9. The toggle joints 13BB through arcuate collars 72, 73, 74 frictionally engage the rim of steering wheel 9. Screws 13A lock the respective toggle joints in selected position with roller 52A rotatably engaging the rim of steering wheel 9. Switch buttons 100 open and close the microphone circuit.

FIGS. 10, 11, 12, 13 and 14 illustrate another modified form of Steering Wheel Microphone Bracket Assembly. The steering wheel of a motor vehicle 9B is illustrated in phantom. The bracket assembly is generally indicated by reference numeral 10C. It comprises a mounting arm 11C provided with a projection 12C having a socket 8C, and three legs 1C, 2C and 3C. Each leg is provided with a passageway 70C having a shoulder 71C. Three leg extensions 200, 201, 202, each provided with a shank, respectively, 203, 204, 205 are slidably mounted in, respective, passageway 70. A coil spring 206 is located in passageway 70 between shoulder 71 and the end of leg extension 200. A bi-furcated member 210 is provided with a slot 211 on one end and spur gear teeth 212 on the other end. Leg extension 200 is pivotally connected to bi-furcated member 210 by means of pivot pin 213 and is located in slot 211. A lever 214 is provided with an arcuate surface 215 on one end and spur gear teeth 216 on the other end. Spur gear teeth 212, 216 are held in mesh condition by two plates 217, 218 placed upon opposite sides of meshed gears 212, 216 and are held in position by means of rivets 220, 221. A removable stop pin 222 passes through plates 217, 218 by means of orifices provided therefor, and said pin lies between spur gear teeth selected for relative position. In this manner, the respective arcuate surface 215 is held in position against the rim of steering wheel 9B.

A switch ring, generally indicated at 234, comprising three flat arms fabricated from electrically insulated material such as plastic, as shown at 230 are fastened to legs 1C, 2C and 3C. An open ring having a base 231 and two inclined upwardly projecting sides 232, 233 is fastened to arms 230. A semi-circular flexible tube 234 provided with a medial rib 235 is fastened to the sides 232, 233. An electrical contact 236 having an electrical conduit or wire 237 is fastened to rib 235. Base 231 is provided with an electrical contact or lead wire 239. When contact 236 engages base 231 the microphone circuit is closed. The operator merely manually pushes on switch ring 234 to open the microphone.

Having shown and described preferred embodiments of the present invention by way of example, it should be realized that structural changes could be made and other examples given without departing from either the spirit or scope of this invention.

What I claim is:

1. A steering wheel microphone bracket assembly comprising a mounting bracket provided with a projection having a socket, a plurality of arcuate collars, means adjustably mounting said collars to said mounting bracket, a plurality of electrical switches, means fastening said electrical switches to said arcuate collars, a pendulum arm having a bearing, means pivotally mounting said bearing to said projection, a bracket having a goose neck, means pivotally connecting said bracket with said goose neck to said pendulum arm, a microphone connected to said goose neck, a microphone plug, means removably securing said microphone plug in said socket, electrical means connecting said microphone to said microphone plug and additional electrical means adapted to connect said microphone plug and said plurality of electric switches to a transmitter receiver.

2. A steering wheel microphone bracket assembly comprising a mounting arm provided with a projection having a socket, a first boss provided with a bi-furcated end, a leg having an elongated slot and a chamber, means slidably fastening said leg to said mounting arm through said elongated slot, a first arcuate collar having a tongue, means pivotally fastening said tongue to said bi-furcated end for adjustment, with a steering wheel arm electrical switch having switch contacts, means securing said electrical switch in said chamber, a switch ring, means mounting said switch ring in said boss in contact with said switch contact, a second boss having a second arcuate collar, means fastening said second boss to said mounting arm, and means mounting said switch ring in said second boss, a pendulum arm having a bearing, means pivotally mounting said bearing to said projection, a bracket having a goose neck, means pivotally connecting said bracket to said pendulum arm, a microphone connected to said goose neck, a microphone plug having a jack, electrical conduits connecting said plug to said microphone and means for removably securing said jack in said socket, and electrical means adapted to connect said jack and said electrical switch to a transmitter-receiver.

3. A steering wheel microphone bracket assembly comprising a mounting arm provided with a projection having a socket, a jack spring fixed in said socket, a first boss provided with a bi-furcated end, a leg having an elongated slot and a chamber, means slidably fastening said leg to said mounting arm through said elongated slot, a first arcuate collar having a tongue, means pivotally fastening said tongue to said bi-furcated end to form a toggle joint for adjustment with a steering wheel, a first electrical switch having switch contacts, a second boss provided with a second bi-furcated end, a second leg having a second elongated slot and a second chamber, a second means slidably fastening said second leg to said mounting arm through said second elongated slot, a second arcuate collar having a second tongue, a second means pivotally fastening said second tongue to said second bi-furcated end to form a second toggle joint for adjustment with a steering wheel, a second electrical switch having switch contacts, a switch ring, means mounting said switch ring in both said first boss and said second boss in operating engagement with both said first electrical switch and said second electrical switch, a pendulum arm having a bearing, means pivotally mounting said bearing to said projection, a bracket having a goose neck, means pivotally connecting said bracket to said pendulum arm, a microphone connected to said goose neck, a microphone plug having a jack, electrical conduits connecting said plug to said microphone with said jack removably secured in said jack spring and electrical means adapted to connect said jack and said first electrical switch and said second electrical switch to a transmitter-receiver.

4. A steering wheel microphone bracket assembly comprising a mounting arm provided with projection having a socket, and three legs, each leg having a passageway provided with a shoulder, three leg extensions, three arcuate collars, one for each leg extension, three toggle joints, one for each collar, pivotally connecting, the respective arcuate collar to the respective leg extension, each leg extension being slidably mounted in the respective passageway, with a spring interposed between the end of the respective leg extension and the respective shoulder, an arm provided with a bearing, means pivotally mounting said bearing to said projection, a bi-furcated bracket, a bracket provided with a goose neck pivotally connected to said bi-furcated bracket, a connecting pin fastened on one end to said arm and on the other end to said bi-furcated bracket, a microphone fastened to said goose neck, three electrical switches, one for each leg extension, means fastening one of said three electrical switches to, respectively, one of said three leg extensions, a microphone plug, electrical conduits connecting said plug to said microphone, and means removably securing said plug in said socket, and electrical means adapted to connect said plug and said three electrical switches to a transmitter-receiver.

5. A steering wheel microphone bracket assembly comprising a mounting arm provided with a projection having a socket and three legs, each leg having a passageway provided with a shoulder, three leg extensions, each having a shank, three levers, one for each leg extension, each lever having an arcuate surface on one end and spur gear teeth on the other end, each leg extension beng slidably mounted respectively, in a passageway, three springs one for each passageway, interposed between the shoulder and the end of the respective leg extension, three bi-furcated brackets, one for each leg extension, provided with spur gear teeth on one end adapted to engage the respective spur gear teeth on a lever, three pivot pins, one for each bi-furcated bracket, connecting a respective shank to a respective bi-furcated bracket, a plurality of plates, two for each of the three respective bi-furcated brackets, a plurality of rivets, each rivet passing through a spur gear and two plates located upon opposite sides of the bi-furcated bracket and lever, respectively, three stop pins adapted to pass, respectively through a pair of plates and a set of spur gear teeth, a pendulum arm provided with a bearing and a fourth bi-furcated bracket means pivotally mounting said bearing to said projection, a bracket provided with a goose neck pivotally connected to said fourth bi-furcated bracket, a connecting pin fastened on one end to said arm and on the other end to said fourth bi-furcated bracket, a microphone fastened to said goose neck, a switch ring comprising a flat circular plate fastened to said three legs, an open ring having a base and two inclined upwardly projecting sides, means fastening said ring to said flat circular plate, a semi-circular flexible tube provided with a medial rib, means fastening said tube to said two inclined sides, a first electrical contact fastened to said rib, two additional electrical contacts fastened to said first base in alignment with said electrical contact, a microphone plug, electrical conduits connecting said plug to said microphone, and means removably securing said plug in said socket, and electrical means adapted to connect said plug and said two electrical contacts to a transmitter-receiver.

6. A steering wheel microphone bracket assembly as described in claim 3, wherein said pendulum comprises a hook and a slot, a roller, a pin fastened in said pendulum rotatably mounting said roller in said slot, whereby said roller is adapted to rotatably engage said steering wheel.

* * * * *